(12) United States Patent
Sasaki

(10) Patent No.: US 7,382,364 B2
(45) Date of Patent: Jun. 3, 2008

(54) INFORMATION PROCESSING APPARATUS, PROGRAM PRODUCT AND INFORMATION PROCESSING SYSTEM

(75) Inventor: Noriyuki Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 451 days.

(21) Appl. No.: 10/658,333

(22) Filed: Sep. 10, 2003

(65) Prior Publication Data

US 2004/0064603 A1  Apr. 1, 2004

(30) Foreign Application Priority Data

Sep. 30, 2002 (JP) .............................. 2002-286909

(51) Int. Cl.
G09G 5/00 (2006.01)
G09G 3/36 (2006.01)
G06F 1/26 (2006.01)
G06F 1/32 (2006.01)

(52) U.S. Cl. .................. 345/211; 345/102; 713/320

(58) Field of Classification Search ............... 345/104, 345/211, 102; 713/300–340
See application file for complete search history.

(56) References Cited

U.S. PATENT DOCUMENTS

| 5,406,305 | A | * | 4/1995 | Shimomura et al. | 345/102 |
| 5,696,978 | A | * | 12/1997 | Nishikawa | 713/324 |
| 5,822,598 | A | * | 10/1998 | Lam | 713/324 |
| 5,894,580 | A | * | 4/1999 | Yoshida | 713/340 |
| 5,907,713 | A | * | 5/1999 | Chen et al. | 713/320 |
| 6,442,443 | B1 | * | 8/2002 | Fujii et al. | 700/94 |
| 6,523,125 | B1 | * | 2/2003 | Kohno et al. | 713/320 |
| 6,552,752 | B1 | * | 4/2003 | Tsuji et al. | 348/730 |
| 6,693,612 | B1 | * | 2/2004 | Matsumoto et al. | 345/87 |
| 6,704,808 | B2 | * | 3/2004 | Kasamatsu et al. | 710/2 |
| 6,947,035 | B1 | * | 9/2005 | Shiraga | 345/211 |
| 2003/0061526 | A1 | * | 3/2003 | Hashimoto | 713/320 |

FOREIGN PATENT DOCUMENTS

| JP | 1-237810 | 9/1989 |
| JP | 11-39769 | 2/1999 |
| JP | 11-126118 | 5/1999 |

* cited by examiner

Primary Examiner—Richard Hjerpe
Assistant Examiner—M. Fatahiyar
(74) Attorney, Agent, or Firm—Staas & Halsey LLP

(57) ABSTRACT

The present invention provides an information processing apparatus, a program and a system in which a user sets data about electric power conditions in the information processing apparatus so as to reduce electric power consumption of the input/output device when the user is not in front of the input/output device. The information processing system comprises the information processing apparatus 101 comprising a storage section 106 for storing the data about the electric power conditions of the input/output device, and the input/output device 110, wherein the information processing apparatus comprises an input/output control section 104, 105 for giving and receiving information to/from the input/output device, and the input/output control section gives instructions about electric power conditions to the input/output device, regardless of whether or not input data from the input/output device or output data to said input/output device is transferred and the input/output device controls the electric power conditions based on the instructions.

18 Claims, 6 Drawing Sheets

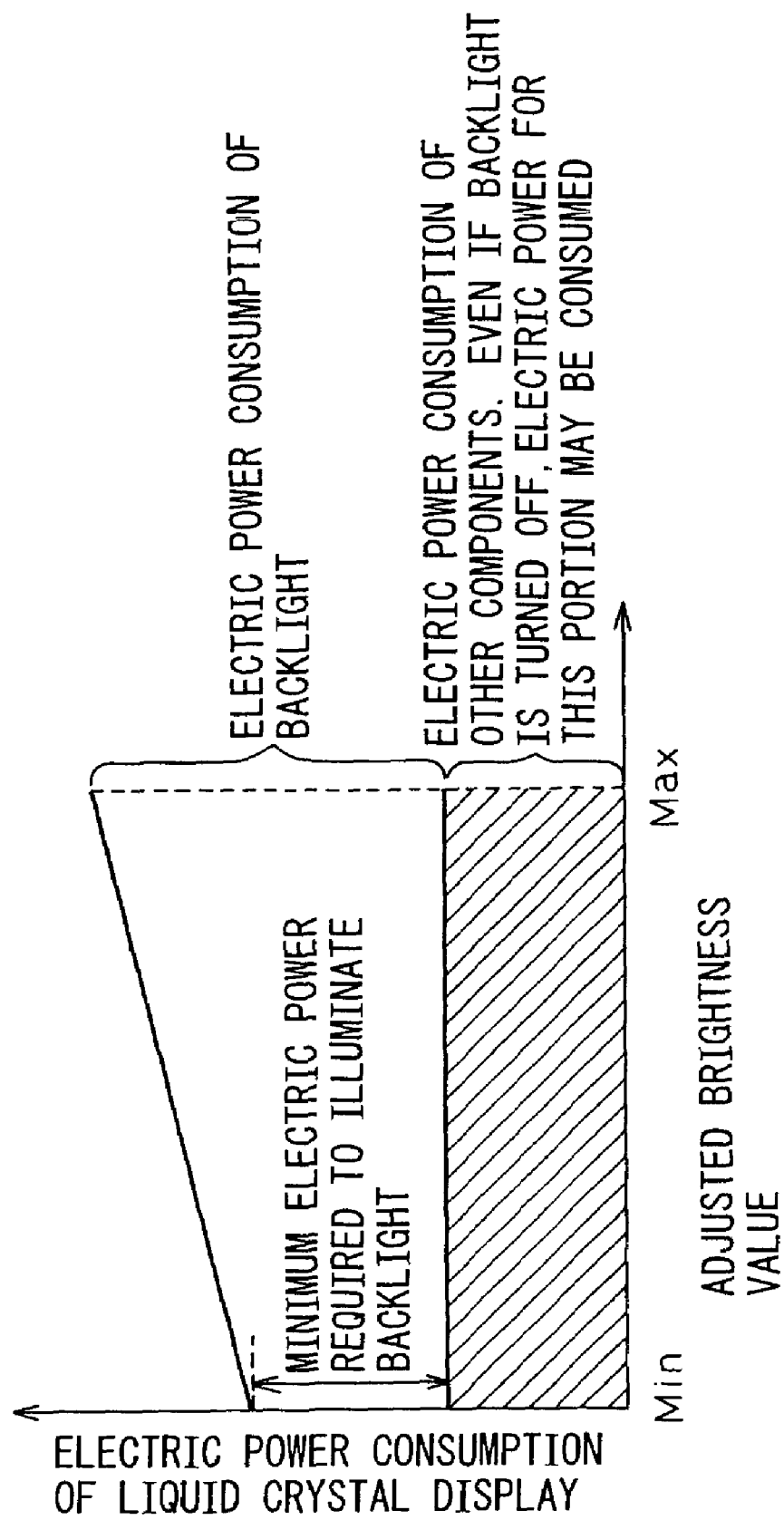

INFORMATION PROCESSING APPARATUS, PROGRAM PRODUCT AND INFORMATION PROCESSING SYSTEM

BACKGROUND OF INVENTION

1. Field of the Invention

The present invention relates to an information processing apparatus, a program product executable by a computer and an information processing system, and in particular, it relates to a system and a method for reducing electrical power consumption of a monitor device that is connected to a computer terminal according to a time setting in the computer terminal.

2. Description of the Related Art

Conventional information processing apparatuses such as computer terminals are increasingly used in a configuration wherein the computer terminals are activated automatically at a time specified by users to perform operations such as e-mail receipt, virus check, TV recording and the like. In such configuration, input/output devices such as monitor devices connected to the computer terminals are powered on at the same time when the computer terminals are activated (see patent documents 1, 2 and 3)

[Patent Document 1]
Japanese Unexamined Patent Publication (Kokai) No. 2002-041397

[Patent Document 2]
Japanese Unexamined Patent Publication (Kokai) No. 11-053066

[Patent Document 3]
Japanese Unexamined Patent Publication (Kokai) No. 10-190855).

In the prior arts described above, there is a problem in that electric power may be consumed uselessly because the input/output devices such as the monitor devices may be powered on even when the users are not in front of the input/output devices. Though the monitor devices typically determine whether or not to enter into power saving mode depending on the presence or absence of a video signal (a synchronization signal), in some operating conditions in which the computer terminals cannot turn off the video signal, the monitor devices cannot enter into the power saving mode and the electric power is wasted continuously even during an unattended operation. Furthermore, if the computer terminals are configured by the users to be activated automatically while the users are sleeping, e.g. at midnight, there is another problem in that the users' sleep may be disturbed due to the brightness of the monitor devices and the sound from speakers.

SUMMARY OF THE INVENTION

In view of the above problems in relation to the prior art, it is an object of the present invention to reduce electric power consumption of an input/output device such as a monitor device when a user is not in front of the monitor device by allowing the user to configure data about electric power conditions of the input/output device such as a relationship between times and power saving settings on an information processing apparatus such as a computer terminal.

In order to achieve the above object, according to a first aspect of the present invention, there is provided an information processing apparatus comprising an input/output control section for giving and receiving information to/from an input/output device, wherein the input/output control section gives instructions about electric power conditions to the input/output device based on data stored in a storage section, regardless of whether or not to transfer input data from the input/output device or output data to said input/output device.

The storage section stores a management table showing a relationship between times and electric power saving control instructions of the input/output device, and the input/output control section gives the instructions to said input/output device according to the management table.

The instructions are given to allow predetermined electric power conditions to be maintained for a predetermined time period.

According to another aspect of the present an information processing apparatus to give instructions about electric power conditions to an input/output device, regardless of whether or not input data from the input/output device or output data to the input/output device is being transferred.

According to yet another aspect of the present invention, there is also provided an information processing system comprising: an information processing apparatus that comprises a storage section for storing data about electric power conditions of an input/output device; and the input/output device, wherein the information processing apparatus comprises an input/output control section for giving and receiving information to/from the input/output device, the input/output control section gives instructions about the electric power conditions to the input/output device based upon the data stored in the storage section, regardless of whether or not to transfer input data from the input/output device or output data to the input/output device, and the input/output device controls the electric power conditions based on the instructions.

BRIEF DESCRIPTION OF THE DRAWINGS

FIG. 6 is a plot describing an effect obtained from the embodiments of the present invention.

DESCRIPTION OF THE PREFERRED EMBODIMENTS

Hereinafter, embodiments of the present invention will be described with reference to drawings.

Figure 1:
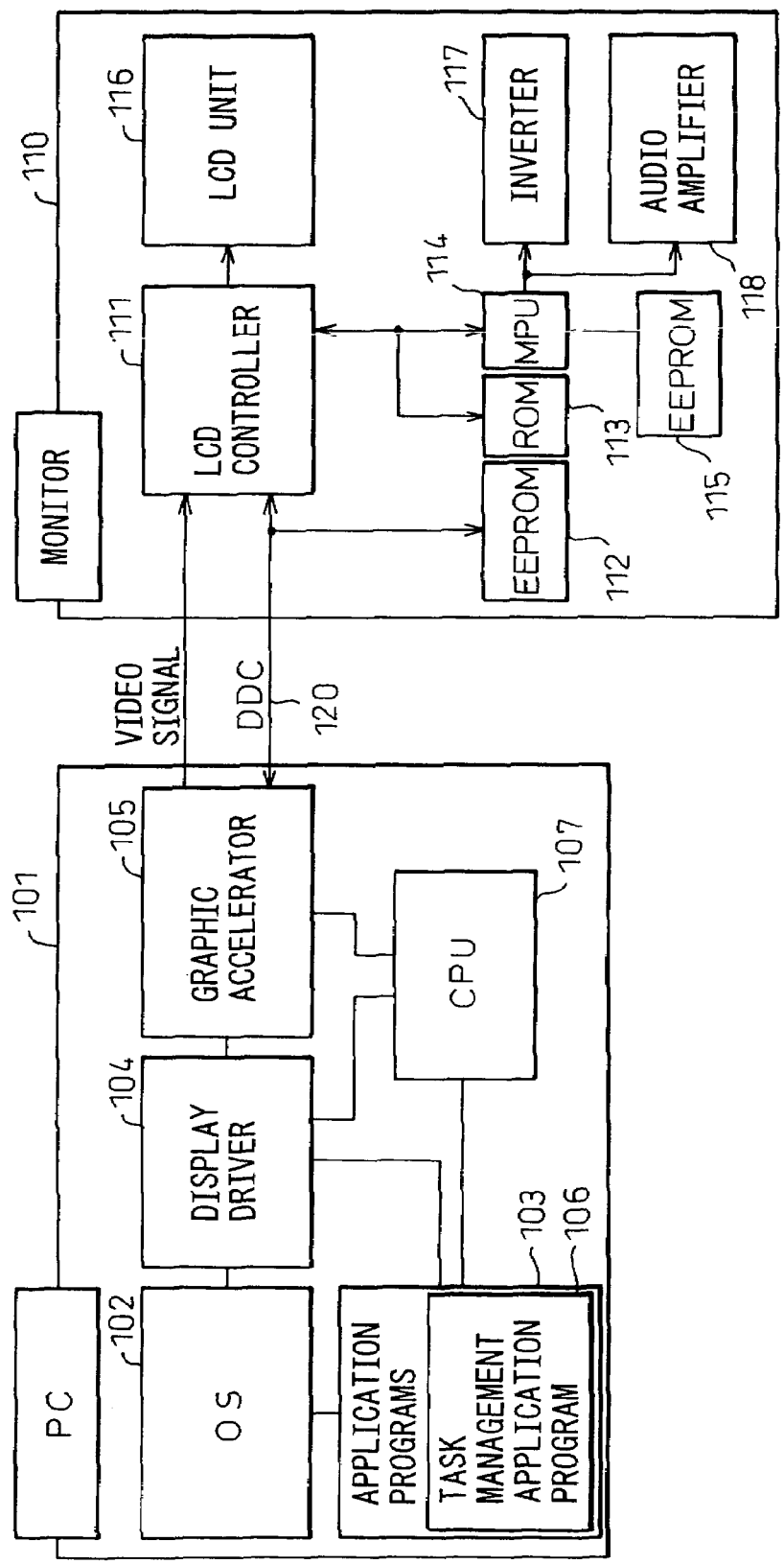
FIG. 1 is a block diagram showing a configuration of an electric power reduction monitor management system according to a first embodiment of the present invention.

FIG. 1 is a block diagram showing a configuration of an electric power reduction monitor management system that is one form of an information processing system according to a first embodiment of the present invention. In this figure, the electric power reduction monitor management system includes a computer terminal 101 (an information processing apparatus) and a monitor device 110 that is one form of an input/output device connected to the computer terminal 101. The computer terminal 101 is a commercially available personal computer (PC) terminal. The computer terminal 101 includes an operating system (OS) 102, an application storage section 103, a display driver 104, a graphic accelerator 105, and a central processing unit (CPU) 107 for controlling various devices in the PC 101 such as the application storage section 103, the display driver 104, the graphic accelerator 105 and the like.

Various application programs are stored in the application storage section 103. According to the present invention, a task management application program 106 is stored in the application storage section 103. In this task management application program 106, a relationship between predetermined times and power saving settings is configured by a user. For example, it may be configured that TV programs are recorded from 2:00 a.m. to 6:00 a.m., during which monitor brightness is set to 20 when the brightest level is represented as 100. Further, a sound level during the TV recording is set to 0. When the monitor device is a liquid crystal display with backlighting as an example of the input/output devices, the monitor brightness may be set by adjusting the backlight brightness. An example of the liquid crystal display device is shown in the figure, wherein it includes a liquid crystal display (LCD) controller 111, an EEPROM 112 for storing EDID (Extended Display Identification Data) that is information about monitor types, resolution and the like, a ROM 113 for storing software programs that operate the monitor device, a microprocessor (MPU) 114 for controlling operation of the entire monitor device, an EEPROM 115 for storing various setting values such as the monitor brightness, contrast, sound level and the like in normal operation, an LCD unit 116, an inverter 117 for driving a cold-cathode tube (backlight) provided in the LCD unit 116, and an audio amplifier 118. The monitor device may not include an audio amplifier 118.

The monitor brightness control configured in the task management application program 106 may be implemented by controlling the brightness of the backlight and, optionally, the contrast and color levels. The electric power consumption of the monitor device 110 may not be reduced by reducing voltage level of video signals or reducing the contrast or the color levels depending on the design configuration of the monitor device 110, but even in such case, there is an effect the monitor brightness is reduced so as not to disturb the user's sleep.

When the monitor device 110 has OSD (On Screen Display) features for displaying on the monitor device 110 set values of the display brightness, the sound level and the like in normal operation, the values may be written on the EEPROM 115 in the monitor device 110.

In the configuration shown in FIG. 1, the graphic accelerator 105 in the computer terminal 101 is connected to the LCD controller 111 in the monitor device 110 via a signal line 120 in accordance with specifications of the DDC/CI (Display Data Channel Command Interface) standard specified by VESA (Video Electronics Standard Association). Commands such as, for example, the ones included in MCCS (Monitor Control Command Set) specified by VESA may be used between the computer terminal 101 and the monitor device 110. For example, in order to reduce electric power consumption by reducing the backlight brightness, a value lower than the previous setting may be sent to an address (10h). In this case, however, there is no command that corresponds to operations such as the backlight turn-off or volume control, though such operations may be supported by adding new commands to addresses (E0h-FFh) that are independently defined addresses allowed by the MCCS.

The values that are sent from the display driver 104 and the graphic accelerator 105 in the computer terminal 101 via the DDC signal line 120 described above are stored in a RAM (not shown) in the LCD controller 111 and, then, are sent to the EEPROM 115 via the MPU 114 to change the monitor brightness and the sound level set in normal operation that are stored in the EEPROM 115. In the monitor device 110, the MPU 114 controls the output of the inverter 117 and the audio amplifier 118 based on the values stored in the RAM in the LCD controller 111.

Figure 2:
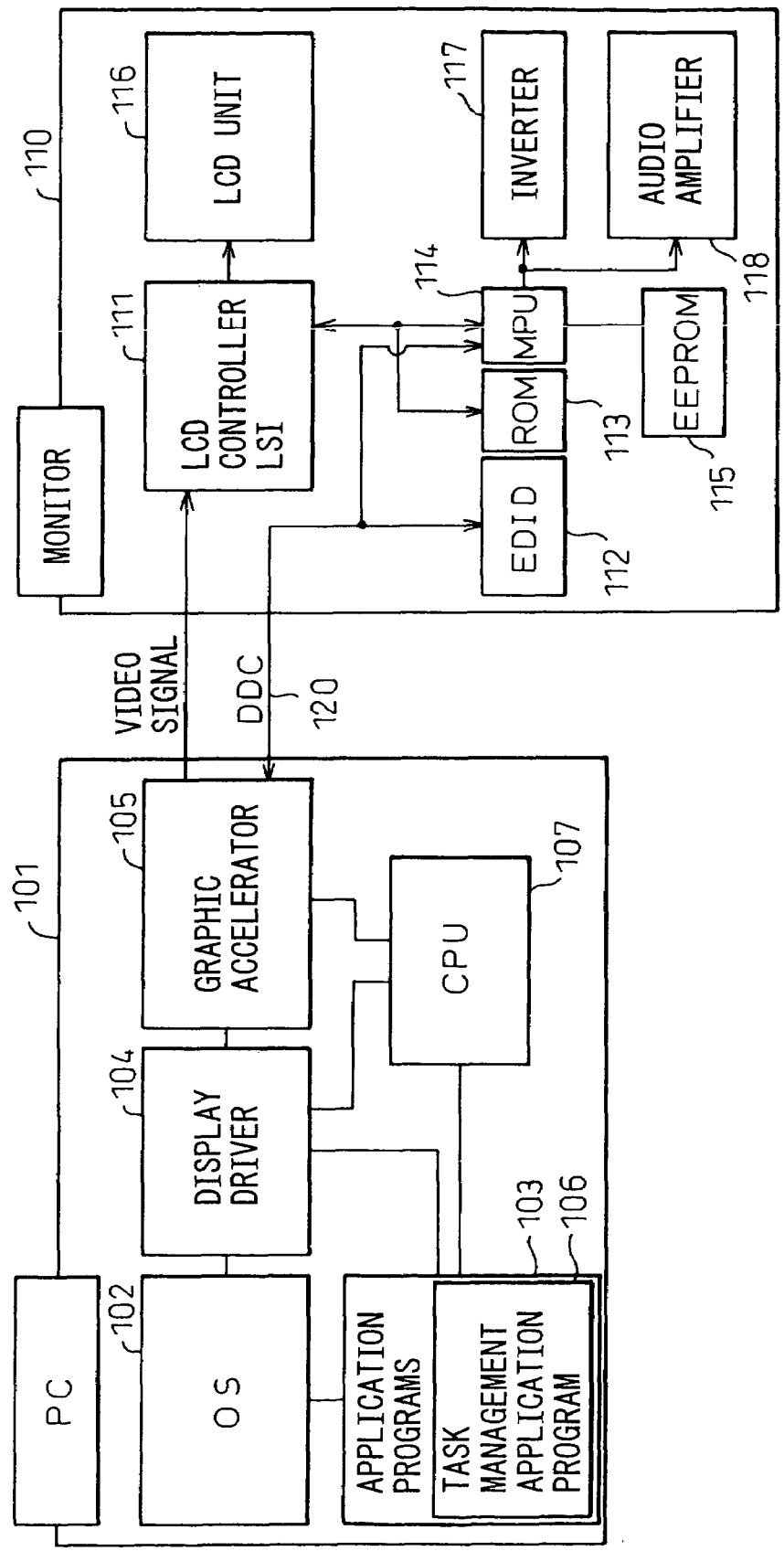
FIG. 2 is a block diagram showing a configuration of an electric power reduction monitor management system according to a second embodiment of the present invention.

FIG. 2 is a block diagram showing a configuration of an electric power reduction monitor management system according to a second embodiment of the present invention. In this figure, same elements as in FIG. 1 are shown. The configuration in FIG. 2 differs from the one in FIG. 1 in that the DDC signal line 120 is connected not to the LCD controller 111 but to the MPU 114. Also, in this configuration, the electric power consumption of the monitor device 110 can be saved according to the values set in the computer terminal 101, just as in FIG. 1.

Figure 3:
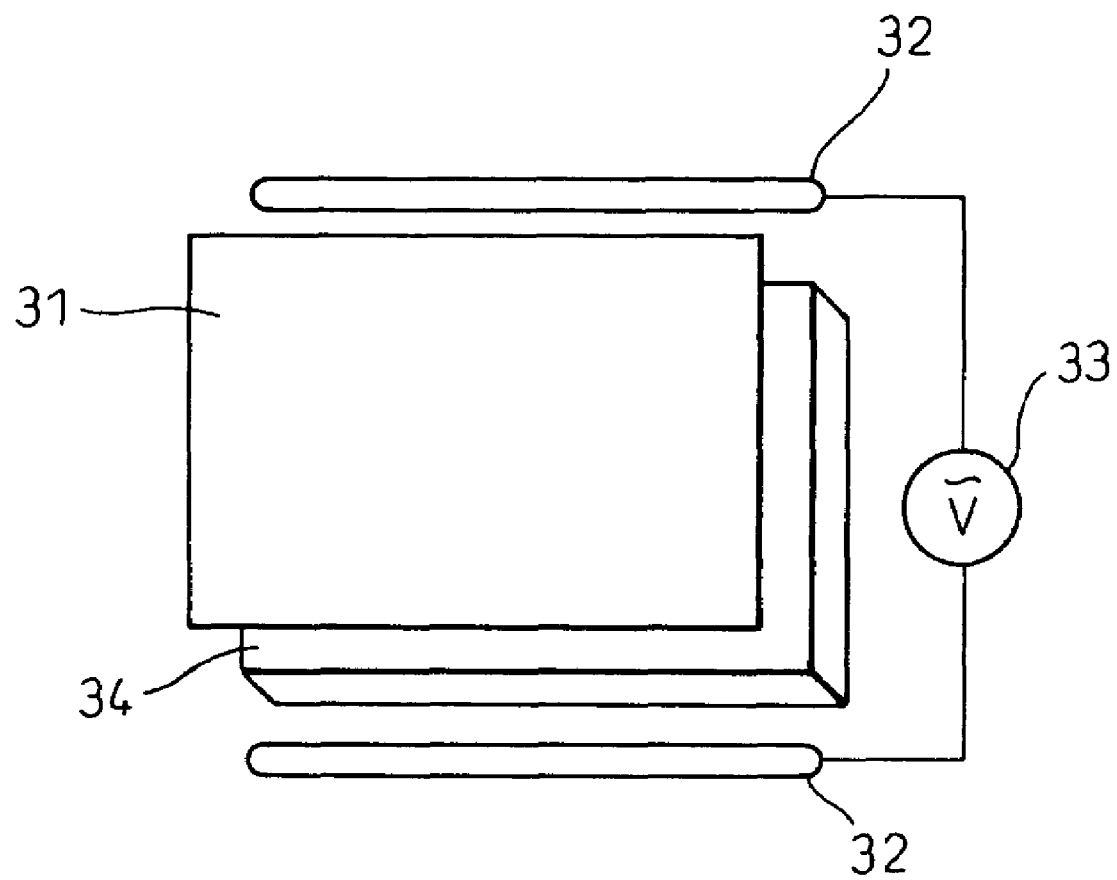
FIG. 3 is a diagram showing a configuration of an LCD unit 116 in a monitor device 110 shown in FIGS. 1 and 2.

FIG. 3 is a diagram showing a configuration of the LCD unit 116 in the monitor device 110 shown in FIGS. 1 and 2. The LCD unit 16 in itself is well-known. In FIG. 3, there are shown a liquid crystal panel 31, a cold-cathode tube 32 that acts as a backlight, an inverter 33 for supplying electric power for the cold-cathode tube 32, and a light guide 34 for guiding light emitted from the cold-cathode tube 32 to the liquid crystal panel 31. According to this embodiment, the electric power supplied to the cold-cathode tube 32 in a predetermined time period can be restricted depending on set values in the task management application 106.

Figure 4:
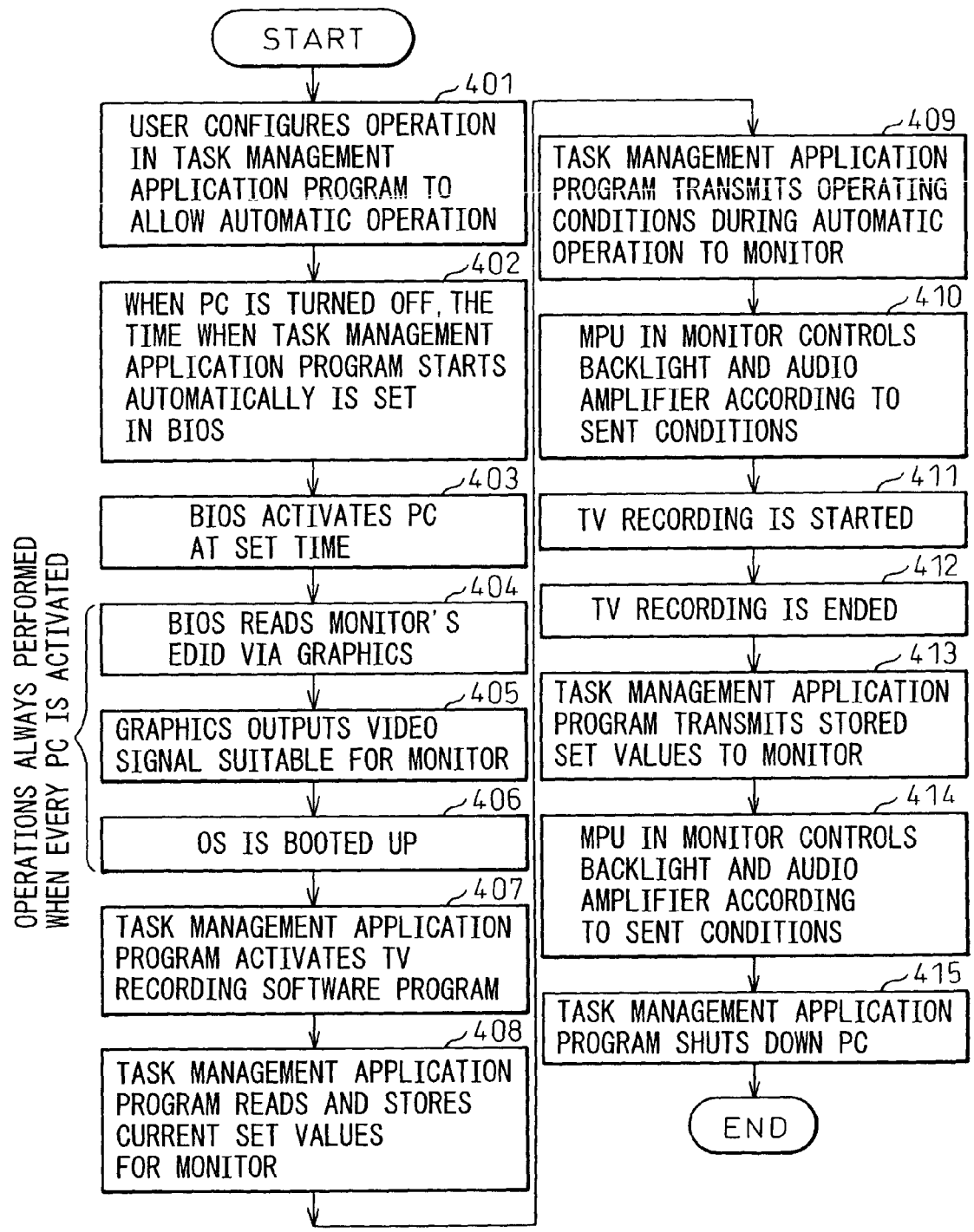
FIG. 4 is a flowchart describing operations of the electric power reduction monitor management system shown in FIGS. 1 and 2.

FIG. 4 is a flowchart describing operations of the electric power reduction monitor management system shown in FIG. 1 or 2. In this figure, in step 401, a user configures an operation in the task management application program 106 to allow the computer terminal 101 and the monitor device 110 to operate automatically. This operation may include, for example, TV recording from 2:00 a.m. to 6:00 a.m., during which the monitor brightness is set to zero and the speaker sound level is also set to zero as described above, a virus scan, a backup and the like. Here, it is to be noted that the backlight is not turned off to set the monitor brightness to zero. Typically, the inverter 117 is not turned off completely while the video signal is supplied from the computer terminal 101 to the monitor device 110, but the brightness is adjusted by adjusting the backlight brightness and, optionally, at least one of the contrast and the color level. Alternatively, the backlight may be turned off by turning off the inverter 117. Further, the sound level may be set to zero by using a mute function of the audio amplifier 118.

Then, in step 402, when the computer terminal (PC) 101 is turned off, the user sets the times when the task management application program 106 starts and ends automatically in a BIOS (Basic Input Output System). The BIOS is a program to control disks, a keyboard, graphics and the like. The BIOS is configured to activate the computer terminal 101 a few minutes before the time when the task management application program 106 starts the operation set by the user automatically.

Then, in step 403, the BIOS activates the computer terminal 101 at the automatic activation time set in step 402.

Then, in step 404, the BIOS utilizes the DDC 120 to read the EDID (a profile of the monitor device) stored in the EEPROM 112 via the graphic accelerator 105.

Then, in step 405, the graphic accelerator 105 outputs the suitable video signal to the monitor device 110 based on the profile of the monitor device read in step 404.

Then, in step 406, the OS 102 is booted up.

Here, it is to be noted that the operations from step 402 to step 406 are performed only when the user configures the task management application program 106 and, then, turns off the computer terminal 101. On the other hand, the operations from step 404 to step 406 are always performed when a computer terminal is activated.

Then, in step 407, the task management application program 106 activates a TV recording software program at the set time.

Then, in step 408, the task management application program 106 reads the current set values for the monitor device 110 from the EEPROM 115 and stores it in the computer terminal 101. This operation is required to restore the monitor device to the initial conditions such as, for example, the brightness level 100 and the sound level 50, after completion of the automatic operation of the computer terminal 101.

Then, in step 409, the task management application program 106 utilizes the DDC 120 to transmit operating conditions during the automatic operation to the monitor 110. In the example shown in FIG. 1, a set value for "the brightness level "0" and the sound level "0"" is sent to the LCD controller 111 (in the case of FIG. 1) or the MPU 114 (in the case of FIG. 2), to which an address 6E is assigned according to the specifications of the DDC/CI (Display Data Channel Command Interface) standard.

Then, in step 410, the MPU 114 in the monitor device 110 controls the inverter 117 and the audio amplifier 118 according to the conditions sent from the computer terminal 101. The electric power supplied to the cold-cathode tube for the backlight can be reduced through the control of the inverter 117. If the monitor device 110 has the OSD (On Screen Display) features, the conditions sent from the computer terminal 101 such as the display brightness, the sound level and the like may be written in the EEPROM 115.

Then, in step 411, the TV recording is started at the set start time.

Then, in step 412, the TV recording is ended at the set stop time.

Then, in step 413, the task management application program 106 transmits the initial set values (the brightness level: 100 and the sound level: 50) stored in step 408 to the device (the LCD controller 111 or the MPU 114) having an address 6E in the monitor device 110 via the DDC 120.

Then, in step 414, the MPU 114 in the monitor device 110 controls the inverter 117 and the audio amplifier 118 according to the sent conditions and, further, writes the sent set values in the EEPROM 115. This restores the monitor device 110 to the conditions in which the user usually uses the monitor device 110.

Then, in step 415, the task management application program 106 shuts down the computer terminal (PC) 101.

According to the operations described above, the electric power consumption of the monitor device can be reduced during the time period set by the user, even if the video signal is output from the computer terminal 101 to the monitor device 110.

Figure 5:
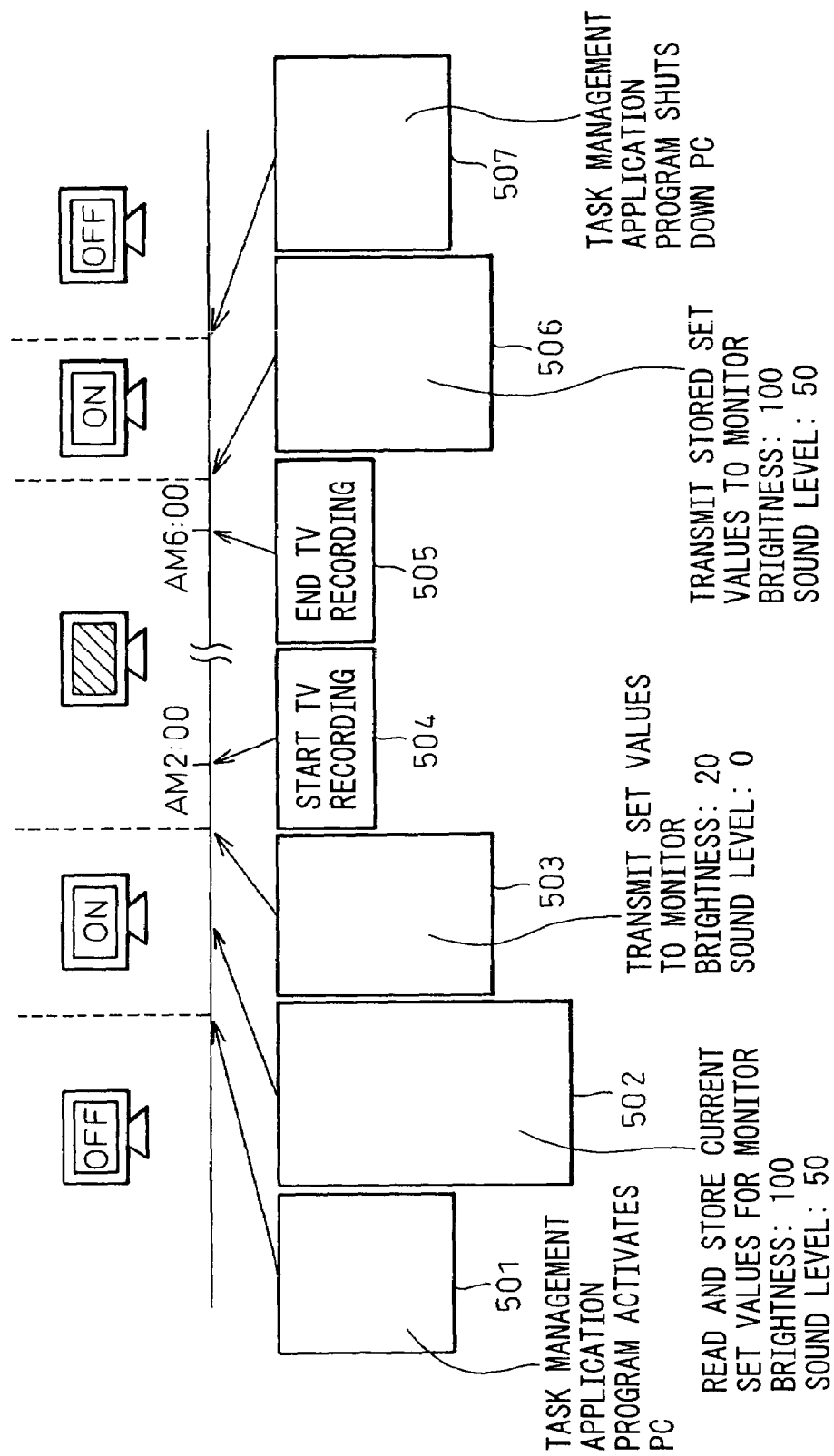
FIG. 5 is a diagram for describing the operations shown in FIG. 4 in an easy-to-understand manner.

FIG. 5 is a diagram for describing the operations shown in FIG. 4 in an easy-to-understand manner. In this figure, in step 501, the task management application program 106 activates the computer terminal (PC) 101. This operation corresponds to step 403 in FIG. 4 and it is performed a few minutes before the actual recording start time.

In step 502, the computer terminal (PC) 101 reads and stores the set values for the monitor device 110. This operation corresponds to step 408 in FIG. 4.

In step 503, the values for electric power reduction set in the task management application program 106 (for example, the brightness level 30 and the sound level 0) are transmitted to the monitor device 110. This operation corresponds to step 409 in FIG. 4.

In step 504, the TV recording is started and, in step 505, the TV recording is ended. Between step 504 and step 505 or from 2:00 a.m. to 6:00 a.m. in the shown example, the brightness of the monitor device is lowered and the sound level is set to zero. Therefore, when the user is not in front of the monitor device 110, unnecessary electric power consumption can be inhibited and the user's sleep is disturbed by the brightness of the display or the sound. The operations in these steps correspond to step 411 and step 412 in FIG. 4.

In step 506, the computer terminal (PC) 101 transmits the set values stored in step 502 to the monitor device 111. This operation corresponds to step 413 in FIG. 4.

In step 507, the task management application program 106 shuts down the computer terminal (PC) 101. This operation corresponds to step 415 in FIG. 4.

FIG. 6 is a plot describing an effect obtained from the embodiments of the present invention. As shown in this figure, as the adjustment value of the brightness is changed from the maximum level to the minimum level, the electric power consumption of the liquid crystal display is reduced proportionately. However, even if the brightness is set to zero, the electric power consumption of the liquid crystal display is not reduced to zero. This is because it is a common practice to always illuminate the backlight irrespective of the brightness set value when the user uses the liquid crystal display. The display brightness of most liquid crystal display products is adjusted by adjusting the backlight brightness. As a certain level of electric power is needed to illuminate the backlight, the electric power consumption of the backlight may not be reduced to zero even if the brightness is adjusted to the minimum value. Further, in addition to the minimum electric power to illuminate the backlight, other components may consume electric power. Even if the backlight is turned off, the electric power for such components may be consumed. According to the embodiments of the present invention, the user can configure the brightness of the monitor device during the automatic operation of the computer terminal in an arbitrary manner. The brightness of the monitor device can be lowered by controlling the brightness and at least one of the contrast and the color level. According to another embodiment of the present invention, instead of controlling the brightness and the contrast or the color level, the backlight may be turned off. Though a screen on the display device is not visible at all when the backlight is turned off, it is no problem if the user is not in front of the monitor device.

The embodiments described above are intended to describe the present invention in an exemplary manner and the present invention is not limited to such embodiments. The present invention may be applied to any display device comprising the backlight. Further, the interconnection between the computer terminal and the monitor device may be established based on any standard instead of the DDC/CI standard specified by VESA.

Further, though a display device or, in particular, an LCD has been described as an example of input/output devices, the present invention may be applied to many other input/output devices such as a CRT, an audio device, a keyboard and a mouse.

As apparent from the above description, according to the present invention, by setting data about electric power conditions in an information processing apparatus, there is an effect in that electric power consumption of an input/output device can be reduced when the information processing apparatus is activated automatically and a user is not in front of the input/output device. Further, there is another effect in that the user's sleep is not disturbed by the brightness of an input/output device such as a monitor device or a sound level even if the information processing apparatus is activated automatically while the user is sleeping such as at midnight.

The method described with reference to FIG. 4 can be realized by a computer program or a computer program product executable by a computer. The program or program product may be delivered through on-line to any destination, or may be stored in any storage medium.

What is claimed is:

1. An information processing apparatus comprising:
   a storage section to store data for electric power saving during automatic operation of said information processing apparatus; and
   an input/output control section to give and receive information to/from an input/output device based on said data stored in said storage section,
   wherein said input/output control section gives instruction about said electric power saving to said input/output device, during said automatic operation, regardless of whether input data from said input/output device or output data to said input/output device is transferred.

2. An information processing apparatus according to claim 1, wherein said storage section stores a management table showing a relationship between time and electric power saving control instruction of said input/output device, and
   said input/output control section gives said instruction to said input/output device according to said management table.

3. An information processing apparatus according to claim 1, wherein said instruction are given to allow predetermined electric power saving to be maintained for a predetermined time period.

4. An information processing apparatus according to claim 1, wherein said input/output device is a display device, and
   said instruction are given to limit brightness of said display device.

5. A program product executed by a computer for allowing an information processing apparatus to give instruction about electric power saving to an input/output device during automatic operation of said information processing apparatus, regardless of whether or not input data from said input/output device or output data to said input/output device is transferred.

6. A program product according to claim 5, wherein said input/output device is a display device, and
   said output data is image data.

7. An information processing system comprising: an information processing apparatus comprising a storage section to store data for electric power saving during automatic operation of said information processing apparatus; and an input/output device,
   wherein said information processing apparatus comprises an input/output control section to give and receive information to/from said input/output device,
   said input/output control section gives instruction about said electric power condition to said input/output device during said automatic operation, regardless of whether or not input data from said input/output device or output data to said input/output device is transferred, and
   said input/output device controls said electric power saving based on said instruction.

8. An information processing system according to claim 7, wherein said input/output device is an LCD comprising a backlight.

9. An information processing system according to claim 8, wherein said input/output device is the LCD comprising the backlight, and
   said LCD limits brightness of said backlight by reducing output electric power of an inverter for driving a cold-cathode tube or by shortening an illuminating time period in a lighting control cycle.

10. An information processing method comprising the steps of:
    storing data for electric power saving during automatic operation of an information processing apparatus in a storage section; and
    giving and receiving information to/from an input/output device by an input/output control section based on said electric power saving,
    wherein said input/output control section gives instruction about said electric power saving to said input/output device during said automatic operation, regardless of whether or not input data from said input/output device or output data to said input/output device is transferred.

11. An information processing method according to claim 10, further comprising the steps of:
    storing a management table showing a relationship between time and electric power saving control instruction of the input/output device; and
    giving instruction by said input/output control section to said input/output device according to said management table.

12. An information processing method according to claim 10, wherein said instruction is given to allow predetermined electric power saving to be maintained for a predetermined time period.

13. An information processing method according to claim 10, wherein said input/output device is a display device, and
    said instruction are given to limit brightness of the display device.

14. An information processing method comprising the steps of:
    storing data for electric power saving during automatic operation of an information processing apparatus in a storage section in an information processing apparatus; and
    giving and receiving information between said information processing apparatus and an input/output device by an input/output control section,
    wherein said input/output control section gives instruction about electric power saving to said input/output device during said automatic operation, regardless of whether input data from said input/output device or output data to said input/output device is transferred, and
    said input/output device controls said electric power saving based on said instruction.

15. An information processing method according to claim 14, wherein said input/output device is an LCD comprising a backlight.

16. An information processing method according to claim 15, wherein said input/output device is the LCD comprising the backlight, and said LCD limits brightness of said backlight by reducing output electric power of an inverter for driving a cold-cathode tube or by shortening an illuminating time period in a lighting control cycle.

17. An information processing method according to claim 10, wherein said input/output device is a speaker, and said instruction are given to reduce an output of said speaker during a predetermined time period.

18. An electric power reduction monitor management method, wherein a task management application program for relating time to power saving setting of the monitor device during automatic operation of an information processing apparatus is stored in a computer terminal in advance and electric power saving control of said monitor device is performed according to the setting of said task management application program during said automatic operation, even when a video signal is input to said monitor device from said computer terminal.

* * * * *